US006240440B1

(12) United States Patent
Kutcher

(10) Patent No.: US 6,240,440 B1
(45) Date of Patent: May 29, 2001

(54) METHOD AND APPARATUS FOR IMPLEMENTING VIRTUAL THREADS

(75) Inventor: Jeffrey M. Kutcher, Spring, TX (US)

(73) Assignee: Sun Microsystems Incorporated, Palo Alto, CA (US)

( * ) Notice: Subject to any disclaimer, the term of this patent is extended or adjusted under 35 U.S.C. 154(b) by 0 days.

(21) Appl. No.: 08/884,901

(22) Filed: Jun. 30, 1997

(51) Int. Cl.[7] .................................................. G06F 9/00
(52) U.S. Cl. ................................ 709/102; 709/104
(58) Field of Search ............................... 709/1, 100, 104, 709/106, 201, 203, 101, 102, 103; 707/4; 711/170, 203, 6, 148

(56) References Cited

U.S. PATENT DOCUMENTS

| 5,179,702 | * | 1/1993 | Spix et al. |
| 5,687,373 | * | 11/1997 | Holmes et al. ....................... 709/302 |
| 5,692,193 | * | 11/1997 | Jagannathan et al. ............... 709/106 |
| 5,848,293 | * | 12/1998 | Gentry ..................................... 710/5 |
| 5,899,990 | * | 5/1999 | Maritzen et al. ......................... 707/4 |
| 6,003,065 | * | 12/1999 | Yan et al. ............................. 709/201 |
| 6,052,711 | * | 4/2000 | Gish .................................... 709/203 |

OTHER PUBLICATIONS

Glenn Krasner, "The Smalltalk–80 Virtual Machine", BYTE Publications Inc., Aug. 1991, pp. 300, 302, 304, 306, 308, 310, 312, 314, 316, 317, 318, 320.
Ronald L. Johnston, "The Dynamic Incremental Compiler of APL/3000," apl79 conference proceedings Part 1, APL Quote Quad, vol. 9, No. 4–Part 1, May 30 –Jun. 1, 1979, Rochester, New York, U.S.A., pp. 82–87.
Leo J. Guibas and Douglas K. Wyatt, "Compilation and Delayed Evaluation in APL," Fifth Annual ACM Symposium on Principles of Programming Languages, Tucson, Arizona, Jan. 23–25, 1978, Table of Contents, pp. iii–8.

Web Page for Java Threads. URL: http://averia.unm.edu/Java%20Tutorial/java/Threads.html, 3 pages, publication date unknown.
Web Page for Intensive Java: Advanced Threads URL: http://www.prominence.com/course/day4.html, 13 pages, publication date unknown.
Web Page for javac–The Java Compiler URL: http://www-.javasoft.com/products/jdk/1.1/docs/tooldocs/solaris/javac.html, 3 pages publication date unknown.
Web Page for Java Threads and Object Models URL: http://www–aig.jpl.nasa.gov/home/decoste/Htmls/Java/Local–Java/Htm, 4 pages, Jan. 16, 1996.
Web Page for rmic–The Java RMI Stub Compiler URL: http://chatsubo.javasoft.com/current/doc/rmi/rmic.html, 3 pages, publication date unknown.
Web Page for Class java.rmi.server, RemoteStub URL: http://chatsubo.javasoft.com/current/doc/rmi/java.rmi.server.RemoteStub.html, 2 pages, publication date unknown.

(List continued on next page.)

Primary Examiner—Majid Banankhah
(74) Attorney, Agent, or Firm—O'Melveny & Myers LLP

(57) ABSTRACT

A method and apparatus that implement a new class of objects: the virtual thread. A virtual thread can execute on the same computer as the application program that creates it or can execute a virtual runnable object on a different computer that is coupled to the computer executing the application program. A virtual thread acts just like a conventional thread and an application program generally accesses a virtual thread in the same way as it does a conventional thread. In a preferred embodiment of the present invention, a Virtual Thread Server object (VTS) maintains a list of available computing resources in a computing system. These resources represent the available computing resources of the system that have registered themselves as having spare computer resources.

16 Claims, 3 Drawing Sheets

OTHER PUBLICATIONS

Web Page for Class java.rmi.server.RemoteObject URL: http://chatsubo.javasoft.com/current/doc/rmi/java.rmi.server.RemoteObject.html, 3 pages, publication date unknown.

Web Page for Interface java.io.Serializable URL: http://chatsubo.javasoft.com/current/doc/rmi/java.io.Serialzable.html, 2 pages, publication date unknown.

Web Page for Class java.rmi.server.UnicastRemoteObject URL: http://chatsubo.javasoft.com/current/doc/rmi/java.rmiserver.UnicastRemoteObject, 2 pages, publication date unknown.

Web Page for Frequently Asked questions—RMI and Object Serialization URL: http://www.infomatik.fh–wiesbaden.de/~ turau/java/serialfaq.h copyright 1996.

* cited by examiner

FIG. 4

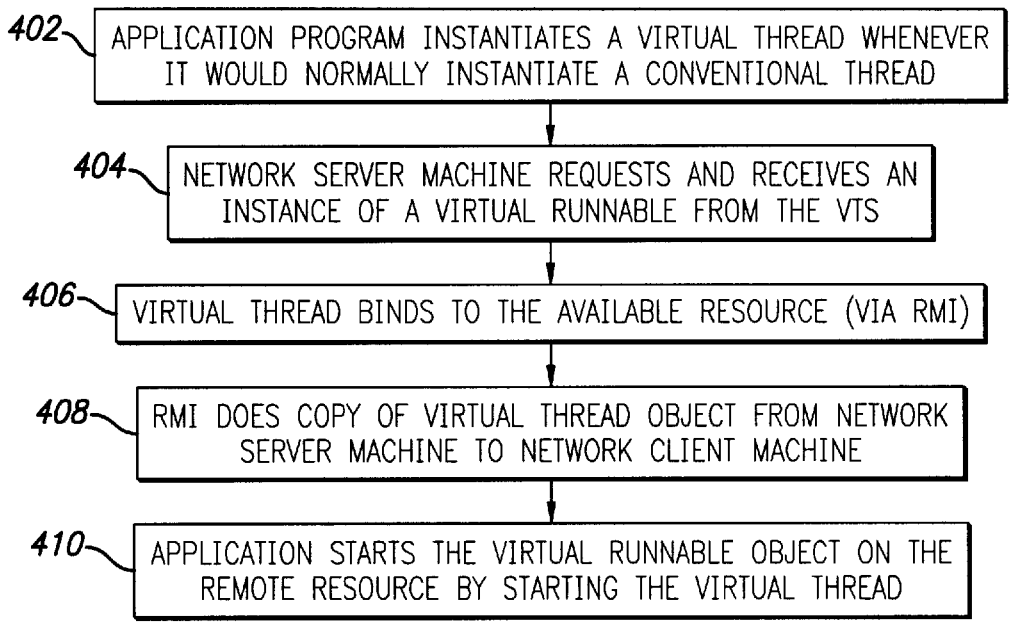

402 — APPLICATION PROGRAM INSTANTIATES A VIRTUAL THREAD WHENEVER IT WOULD NORMALLY INSTANTIATE A CONVENTIONAL THREAD

404 — NETWORK SERVER MACHINE REQUESTS AND RECEIVES AN INSTANCE OF A VIRTUAL RUNNABLE FROM THE VTS

406 — VIRTUAL THREAD BINDS TO THE AVAILABLE RESOURCE (VIA RMI)

408 — RMI DOES COPY OF VIRTUAL THREAD OBJECT FROM NETWORK SERVER MACHINE TO NETWORK CLIENT MACHINE

410 — APPLICATION STARTS THE VIRTUAL RUNNABLE OBJECT ON THE REMOTE RESOURCE BY STARTING THE VIRTUAL THREAD

FIG. 5A

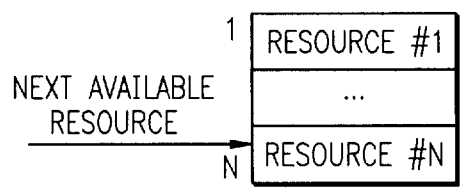

NEXT AVAILABLE RESOURCE →

| 1 | RESOURCE #1 |
|---|---|
|   | ... |
| N | RESOURCE #N |

FIG. 5B

|   | INFO ABOUT RESOURCE | RUNNABLE RESOURCES | AVAILABLE FLAG |
|---|---|---|---|
| 1 | INFO ABOUT RESOURCE #1 | RESOURCE #1 | AVAILABLE=TRUE |
|   | ... | ... | ... |
| N | INFO ABOUT RESOURCE #N | RESOURCE #N | AVAILABLE=FALSE |

METHOD AND APPARATUS FOR IMPLEMENTING VIRTUAL THREADS

FIELD OF THE INVENTION

This application relates to a method and apparatus for spreading execution of a computer program among available computer resources and, particularly, to a method and apparatus for implementing virtual programming threads in the Java programming language.

BACKGROUND OF THE INVENTION

Many computing environments have resources that are not being completely used at all times. For example, a large corporation may have many PCs (personal computers), NCs (network computers), or other types of computers, computing devices, or computing resources that are networked together. These computing resources often sit idle for long periods of time (such as at night). What is needed is a way to use these available computing resources to solve computationally intensive problems, such as higher level mathematics functions or calculating a previous day's financial activity for the company.

The Java programming language is an object-oriented programming language. This means that all data and activity in a Java program are organized around the concept of "classes" and "interfaces". A class contains data and methods that operate on that data. When a class implements an interface, the class defines the methods of the interface. Objects are created by creating instances of classes. Further details of Java, and of object-oriented programs in general, can be found in the following publications, both of which are herein incorporated by reference: *The Java Tutorial: Object-Oriented Programming for the Internet* by Mary Campione and Kathy Walrath, which is available in printed form and is also available at http://java.sun.com:80/docs/books /tutorial/index.html; and *The Java Language Specification* by James Gosling, Bill Joy, and Guy Steele, which is available in printed form and is also available at http://java.sun.com:80/docs/books/jls/html/index.html.

One class that exists in the Java programming language is the java.lang.Thread class. Threads are independent pieces of logic within a Java application or applet. (In this document, the term application is used for both applications and applets). Each thread executes in a single Java virtual machine. Although, more than one thread can be active at any one time in a virtual machine, a virtual machine generally is resident on one computer. Threads are described in more detail in Chapter 17 of the *Java Language Specification*, cited above. Conventional Java classes are discussed in more detail in the Java Development Toolkit (JDK), which is available in printed form and is also available at:

http:llwww.javasoft.com/products/jdk/1.1/docs/index.html.

The JDK is herein incorporated by reference.

SUMMARY OF THE INVENTION

The present invention overcomes the problems and disadvantages of the prior art by implementing a new class of objects: the virtual thread. A virtual thread can execute on the same computer as the application program that creates it or can execute on a different computing resource that is coupled to the computer executing the application program. A virtual thread acts just like a conventional thread and an application program generally accesses a virtual thread in the same way as it does a conventional thread. The virtual thread class uses a "remote thread" class that mimics the methods of the conventional java.lang.Thread class.

In a preferred embodiment of the present invention, a Virtual Thread Server object (VTS) maintains a list of available computing resources in a computing system. These computing resources represent the available PCs, NCs, etc. of the system that have registered themselves as having spare computer resources. Alternately, computing resources can also include resources such as extra printers, memory, etc. During execution of an application program, the application program instantiates a virtual thread in virtual thread class 112. A resource request method requests a computing resource from the VTS. Once a resource is identified to the resource request method, the application program (more specifically, the current instance of the virtual thread) establishes a binding between itself and the available resource and passes an instance of a virtual runnable object to the available resource via a Remote Method Invocation (RMI) technique of Java. The computing resource then executes the virtual runnable object.

During the program design phase, whenever the designer would normally use a thread, he would instead use a virtual thread. Although the virtual runnable object associated with the thread executes on the system that was identified as an available resource, this fact is completely transparent to the application program. From the perspective of the application program, the virtual thread acts identically to a conventional thread. Application programs, however, must understand their environment and must be aware that not all computing resources are the same. For example, some computing resources may have disks or differing amounts of memory. Thus, while application programs cannot necessarily assume that all computing resources are the same, any application program that would normally use threads can make use of idle system resources by using the virtual thread class instead of the conventional thread class.

In accordance with the purpose of the invention, as embodied and broadly described herein, the invention relates to a method of implementing a virtual thread in a data processing system having at least a first virtual machine and a second virtual machine, comprising the steps, performed by at least one processor, of: instantiating, by an application program in the first virtual machine, a virtual thread as a virtual thread object; requesting, by a requesting method in the first virtual machine, a next available computing resource; receiving, by the requesting method, an identity of a next available computing resource; copying a virtual runnable object for the virtual thread to the next available computing resource; and executing the virtual runnable object on the second virtual machine, thus implementing the virtual thread.

In further accordance with the purpose of the invention, as embodied and broadly described herein, the invention relates to an apparatus that implements a virtual thread in a data processing system having at least a first computer and a second computer, comprising: a portion, in an application program in the first computer, configured to instantiate a virtual thread as a virtual thread object; a portion, in the virtual thread object in the first computer, configured to request a next available computing resource; a portion of the virtual thread object, configured to receive an identity of a next available computing resource; a portion configured to copy a virtual runnable object for the virtual thread to the next available computing resource; and a portion, on the second computer, configured to execute the virtual runnable object, thus implementing the virtual thread.

Advantages of the invention will be set forth in part in the description which follows and in part will be obvious from the description or may be learned by practice of the invention. The objects and advantages of the invention will be realized and attained by using the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 is a flow chart showing steps performed by an application program to request and obtain an available computing resource from the VTS, to bind to the available resource, and to execute the virtual thread on the computing resource.

FIGS. 5(*a*) and 5(*b*) each show an example format for a list of available resources kept by the VTS.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

The present invention introduces a Java class called a "virtual thread". This class is invoked by an application program in the same manner as a conventional thread. The difference, however, is that an instance of a virtual runnable object may be executed on a different computing device (virtual machine). The following paragraphs provide details of the nature and implementation of a preferred embodiment of virtual threads.

I. Background

Figure 1:
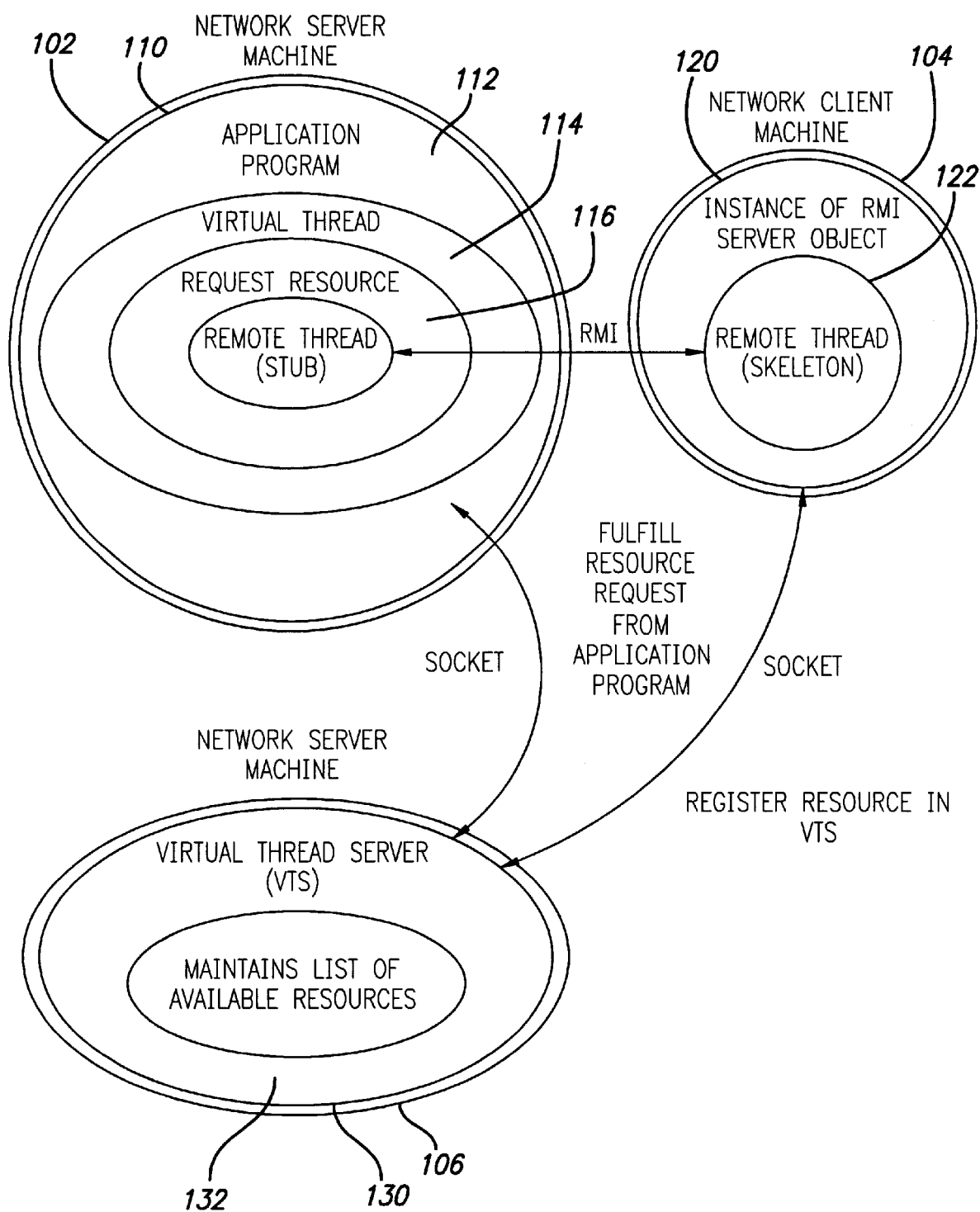
FIG. 1 is a block diagram of a computer system used in accordance with a preferred embodiment of the present invention.

FIG. 1 is a block diagram of a computer system used in accordance with a preferred embodiment of the present invention. The computer system includes a network server machine 102, which executes an application program 110. Server machine 102 is coupled to at least one network client machine 104, such as a personal computer (PC), a network computer (NC), a personal digital assistant (PDA), or any other appropriate computing resource. Server machine 102 is also capable of communicating with a virtual thread server (VTS) object 130, which can exist on the same computer as the application program 110 or on a different computer 106. Network server machines 102 and 106 and network client machine 104 can be the same machine of different machines.

As shown in FIG. 1, server machine 102 includes an application program 110, which creates one or more instances of a virtual thread class 112 that includes a request resource method 114. The virtual thread class 112 calls a remote thread class, which includes "stubs" 116 for communicating with "skeletons" 122 in a remote server application 120 executing on the client machine 104. The concept of stubs and skeletons are known to persons of ordinary skill in the art and are associated, for example, with an aspect of the Java programming language called Remote Method Invocation (RMI).

As shown in FIG. 1, the VTS maintains a list 132 of available computing resources in the system. These available resources in the network environment have identified themselves to the VTS as having excess computing resources. A computing resource can be a mainframe computer, a PC, an NC, a network toaster, or some other networked device having computing power. There can be one or more VTSs.

Although not explicitly shown in FIG. 1, it should be understood that server machine 102 and each client machine 104 includes memory and at least one processor, in addition to appropriate input/output lines; input devices, display devices. Each computer can also include an input device, such as a floppy disk drive or CD ROM reader, that reads computer instructions stored on computer readable medium, such as a floppy disk or a CD ROM. These computer instructions are the instructions of e.g., the user application and/or methods called by the user application, and can also include computer instructions executed on one or more or the client machines.

In the following discussion, it will be understood that the steps of the methods and flow charts discussed preferably are performed by the appropriate processor executing instructions stored in memory of the client machine, the server machine, or the machine hosting the VTS. It will also be understood that, although the following paragraphs describe an implementation of the present invention using the Java programming language, the invention is not limited to the Java language and may be implemented for any appropriate object-oriented language that includes or can be modified to include invocation of remote methods. Java is a trademark of Sun Microsystems, Inc.

It will also be understood that computer instruction/code embodying the present invention can have the form of a computer data signal embodied in a carrier wave and representing a sequence of instructions which, when executed by a processor, cause the processor to implement some aspect of a virtual thread.

Figure 2:
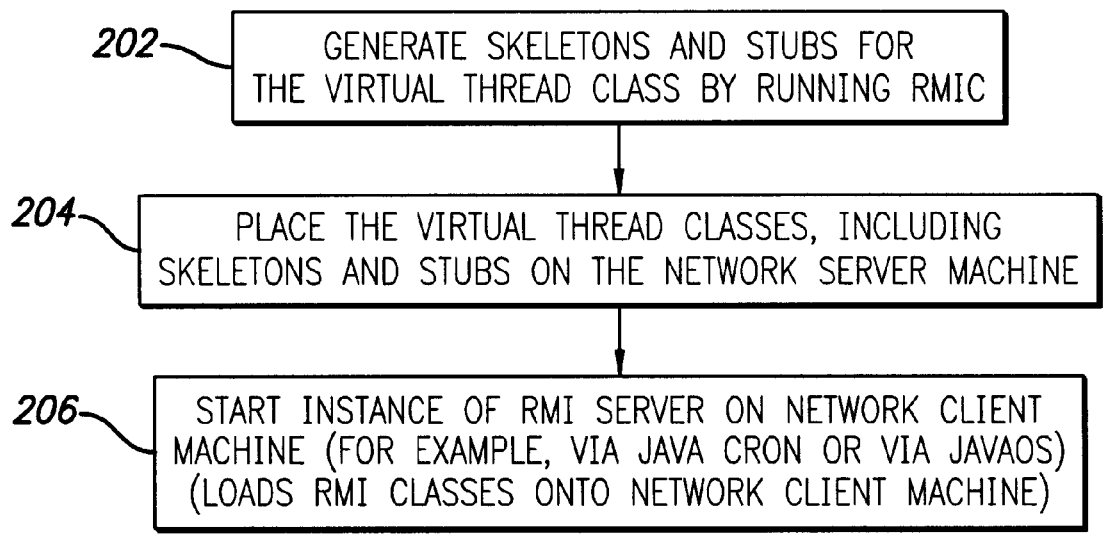
FIG. 2 is a flow chart showing steps performed by a client machine and a server machine to initialize an environment for a Remote Method Invocation (RMI) technique.

FIG. 2 is a flow chart showing steps performed by server machine 102 and client machine 104 to initialize an environment for RMI. In step 202, the RMI compiler (RMIC) generates stubs and skeletons for the methods of the remote thread class. In step 204, the classes associated with the virtual thread are placed on the server machine. These classes include a virtual thread class and a remote thread class. To implement the remote thread class (which is used by the virtual thread class) the following need to be defined: an interface class for remote threads; an implementation class for remote threads; and a RemoteThread class. The remote thread class mimics the methods of the conventional thread class, and has a method corresponding to each method of the conventional thread class. (The virtual thread class is not an extension of the thread class, since the thread class is a non-extendible final class).

The virtual thread class extends the remote thread class and implements the virtual runnable interface. The virtual runnable interface is an empty interface that extends the java lang runnable and java lang Serializable. A runnable object is a Java interface that classes implement if they are going to be run inside a thread.

In step 206, an instance of the RMI server is started on the client network machine. The RMI server can be started, for example, automatically by the JavaOS, by way of a Java cron thread, or using any other appropriate method of starting the RMI server. This step loads the necessary classes to implement a virtual thread onto the network client machine.

Figure 3:
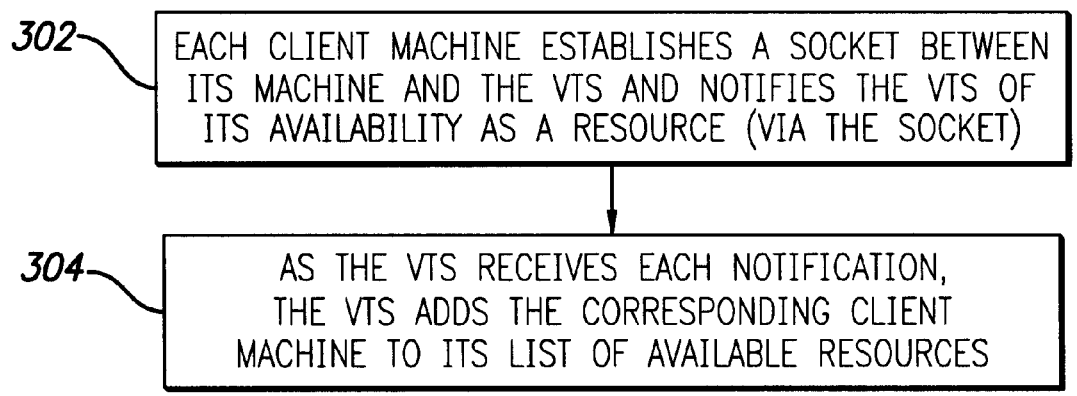
FIG. 3 is a flow chart showing steps performed by a client machine to register itself with a Virtual Thread Server (VTS) as an available computing resource.

FIG. 3 is a flow chart showing an example of steps performed by a client machine to register itself with a Virtual Thread Server (VTS) as an available resource. If the client machine has spare computing time that is not being used, the RMI object 120 establishes a socket to the VTS 130 in a manner known to persons of ordinary skill in the art. In step 304, the Java cron (or other appropriate logic) then notifies the VTS that the client machine should be registered as an available resource by the VTS. In step 304, the VTS 130 adds the available resource to its list 132. The list of available resources is discussed below in more detail in connection with FIGS. 5(*a*) and 5(*b*).

Although it is not shown in FIG. 3, the client machine could also decide to de-register itself with the VTS during step 304 if it no longer has available computing resources.

II. Instantiating Virtual Threads

FIG. 4 is a flow chart showing steps performed by an application program to request and obtain an available system resource from the VTS, to bind to the available resource, and to execute a virtual runnable object on the resource. In step 402, the application program 102 instantiates a virtual thread when it would normally instantiate a conventional thread. In step 404, the Request Resource method opens a socket to the VTS, as is known to persons of ordinary skill in the art. Using the socket, the method requests an available resource from VTS 130 and receives an identification of a computing resource from the VTS 130.

In step 406, the virtual thread (via RMI) binds the server machine to the client machine and, in step 408, copies the virtual runnable object from the network server machine to the network client machine (e.g., resource 104) using the RMI stub and skeleton, as is generally known in the art. In this case, invoking a remote method involves copying the instance of the virtual runnable object for the virtual thread to the client machine 104, where it is executed by client machine 102.

FIGS. 5(*a*) and 5(*b*) each show an example of a format of the list of available resources 132. List 132 can have any of a variety of appropriate formats. In the implementation of FIG. 5(*a*), the VTS 130 merely assigns the resources on a round-robin basis and does not keep track of attributes or capabilities of the resource. When a request for a resource arrives from the application program 114, the VTS assigns the next available resource and adjusts the "next" pointer.

Alternately, as shown in FIG. 5(*b*), the VTS can receive a description of capabilities of the resource when the resource registers itself. In this situation, when an application program requests a resource, it can indicate specific requirements for the resource that it needs (memory size, CPU speed, number of CPUs, etc.). The VTS 130 then returns a resource that matches these capabilities. In a preferred embodiment, once a resource is assigned, it is marked as taken off the list. Other implementations may retain a resource on the list if it can be determined that the resource still has excess capabilities.

In summary, if a network contains a number of computing resources 104 that can execute virtual threads in accordance with the present invention, it is possible to distribute virtual threads across the system, thus taking advantage of the unused computing power of the system.

Other embodiments will be apparent to those skilled in the art from consideration of the specification and practice of the invention disclosed herein. For example, the present invention can be implemented in languages other than the Java language or in languages that are based on or similar to the Java language developed by Sun Microsystems. It is intended that the specification and examples be considered as exemplary only, with a true scope of the invention being indicated by the following claims and equivalents.

What is claimed is:

1. A method of implementing a virtual thread in a data processing system including a plurality of computing resources distributed among at least one server and a plurality of clients, the method comprising the steps of:

instantiating, by an application program executing on the server, a virtual thread as a virtual thread object, the virtual thread object including a request resource method;

requesting, by the request resource method of the virtual thread object, a next available computing resource;

registering, by at least one of the plurality of clients, with a Virtual Thread Server (VTS), the next available resource, when at least one of the plurality of clients has excess computing resources;

receiving, by the request resource method, an identity of one of the clients as the next available computing resource;

copying an instance of a virtual runnable object for the virtual thread from the server to the identified client; and executing the virtual runnable object on the identified client, thereby implementing the virtual thread on the next available computing resource.

2. The method of claim 1, wherein the requesting step includes the step of opening a socket to a Virtual Thread Server (VTS).

3. The method of claim 1, wherein the requesting step includes the step of requesting a next available resource that has a particular configuration.

4. The method of claim 1, wherein the copying step is performed via a Remote Method Invocation (RMI) technique.

5. The method of claim 1, further comprising the step of de-registering one of the registered clients, when it ceases to have excess computing resources.

6. The method of claim 1, wherein the registering step includes the step of establishing a socket between at least one of the plurality of clients and the VTS.

7. The method of claim 5, wherein the deregistering step includes the step of establishing a socket between the at least one of the plurality of clients and the VTS.

8. An apparatus that implements a virtual thread in a data processing system having at least a first computer and a second computer, comprising:

a portion, in an application program in the first computer, configured to instantiate a virtual thread as a virtual thread object;

a portion, in the virtual thread object in the first computer, configured to request a next available computing resource;

a portion, in the second computer, configured to register with a Virtual Thread Server (VTS) as an available resource, when the second computer has excess computing resources;

a portion of the virtual thread object, configured to receive an identity of the next available computing resource;

a portion configured to copy a virtual runnable object for the virtual thread to the next available computing resource; and a portion, on the second computer, configured to execute the virtual runnable object, thus implementing the virtual thread.

9. The apparatus of claim 8, wherein the requesting portion includes a portion configured to open a socket between a Virtual Thread Server (VTS) and the first computer.

10. The apparatus of claim 8, wherein the requesting portion includes a portion configured to request the next available resource that has a particular configuration.

11. The apparatus of claim 8, wherein the copying portion operates in accordance with a Remote Method Invocation (RMI) technique.

12. The apparatus of claim 1, further comprising a portion configured to de-register the second computer, when the second computer ceases to have excess computing resources.

13. The apparatus of claim 1, wherein the registering portion includes a portion configured to establish a socket between the second computer and the VTS.

14. The apparatus of claim 12, wherein the deregistering portion includes a portion configured to establish a socket between the second computer and the VTS.

15. A computer program product, including
a computer usable medium having computer readable code embodied therein for causing implementation of a virtual thread object, the computer program product comprising:
    computer readable program code devices configured to cause a first computer to effect instantiating, by an application program in the first computer, a virtual thread object;
    computer readable program code devices configured to cause the first computer to effect requesting a next available computing resource from a Virtual Thread Server (VTS);
    computer readable program code devices configured to cause a second computer to register with a Virtual Thread Server (VTS) as an available resource, when the second computer has excess computing resources;
    computer readable program code devices configured to cause the first computer to effect receiving an identity of the next available computing resource;
    computer readable program code devices configured to cause a computer to effect copying a virtual runnable object for the virtual thread to the next available computing resource; and
    computer readable program code devices configured to cause the second computer to effect executing the virtual runnable object.

16. A computer data signal embodied in a carrier wave and representing sequences of instructions which, when executed by a processor, cause the processor to implement one aspect of a virtual thread object by performing the steps of:
    executing an application program in the first computer, to instantiate a virtual thread as a virtual thread object;
    executing a computer program in the first computer to request a next available computing resource from a Virtual Thread Server (VTS);
    executing a computer program in a second computer to register with a Virtual Thread Server (VTS) as an available resource, when the second computer has excess computing resources;
    executing the computer program to receive an identity of the next available computing resource;
    executing the computer program to copy a virtual runnable object to the next available computing resource; and
    executing the virtual runnable object on the second computer.

* * * * *